United States Patent [19]

Udall et al.

[11] 4,260,006
[45] Apr. 7, 1981

[54] TIRE AND WHEEL RIM ASSEMBLIES

[75] Inventors: William S. Udall, Sutton Coldfield; Wilfred H. Harrington, Solihull, both of England

[73] Assignee: Dunlop Limited, London, England

[21] Appl. No.: 56,267

[22] Filed: Jul. 10, 1979

[30] Foreign Application Priority Data

Jul. 29, 1978 [GB] United Kingdom ............... 31656/78

[51] Int. Cl.³ .......................... B60C 7/24; B60C 15/00
[52] U.S. Cl. ............................... 152/362 R; 152/379.3
[58] Field of Search .......... 152/362 R, 362 CS, 379.1, 152/379.2, 381.1, 381.2, 330 RF

[56] References Cited

U.S. PATENT DOCUMENTS 3,884,286  5/1975  Verdien ............................. 152/379.2
4,148,348  4/1979  French et al. ...................... 152/379.1

Primary Examiner—Michael W. Ball
Attorney, Agent, or Firm—Stevens, Davis, Miller & Mosher

[57] ABSTRACT

A tire and wheel rim assembly in which the rim includes adjacent to the bead seat a circumferentially extending groove and the tire bead has a radially and axially inwardly projecting toe, the tip of which is engaged in the groove whereby the toe is flexible perpendicular to its length to allow tire fitting. However the toe is substantially rigid in the direction of its length, and is provided with an abutment means on the axially inward surface of the bead toe to contact the rim upon rotation of the bead to assist in retaining the bead at its seat.

19 Claims, 3 Drawing Figures

TIRE AND WHEEL RIM ASSEMBLIES

This invention relates to tire and wheel rim assemblies and in particular to improvements to the assemblies as shown in assignee's U.S. Pat. No. 4,148,348 issued Apr. 10, 1979.

The aforementioned patent relates to a tire and wheel assembly wherein the tire comprises a tread portion, sidewalls and a pair of beads each containing a substantially inextensible annular reinforcement and being seated upon a bead seat one at each side of the wheel rim; the wheel rim including a tire fitting well and being formed axially inward of and adjacent to at least one bead seat to provide a circumferentially extending groove which axially and radially locates at least the radially inward extremity or tip of an extended toe portion of the associated tire bead. This toe portion comprises elastomeric material and extends lengthwise from the annular reinforcement to the tip in a direction radially and axially inward of the annular reinforcement, being flexible in a direction perpendicular to its length to allow tire fitting and being substantially rigid in the direction of its length such that when an axially inward force at the tread portion is applied to the bead by the tire sidewall in the ground contacting portion of the tire circumference, a substantially radially and axially outwardly directed force is generated at the annular reinforcement, the generated force tightening the annular reinforcement and retaining the bead.

We have now discovered that the bead retention efficiency may be still further improved by means of the present invention which provides in one aspect a tire and wheel rim assembly wherein the tire comprises a tread portion, sidewalls and a pair of beads each containing a substantially inextensible annular reinforcement and being seated upon a bead seat one at each side of the wheel rim. This wheel rim includes a tire fitting well and being formed axially inward of and adjacent to at least one bead seat to provide a circumferentially extending groove which axially and radially locates at least the radially inward extremity or tip of an extended toe portion of the associated tire bead. The toe portion comprises elastomeric material and extends lengthwise from the annular reinforcement to the tip in a direction radially and axially inwards of the annular reinforcement, being flexible in a direction perpendicular to its length and having a cross-section relative to the wheel rim groove to allow tire fitting by inflation pressure to locate the toe in said groove and being substantially rigid in the direction of its length such that when an axially inwards force at the tread portion is applied to the bead by the tire sidewall in the ground contacting portion of the tire circumference, the tip of the toe remains in the groove and the bead is caused to rotate wherein an abutment means comprising elastomeric compound is provided between the tire bead and the wheel rim axially inwards of a radial plane through the axially innermost point of the toe tip where said point contacts the rim in the fitted position. The abutment means is such that abutment with the wheel rim occurs after initial rotation of the bead and said abutment means subsequently generates additional bead retaining forces to those generated by the toe in the groove.

In a preferred arrangement the abutment means comprises a hump formed on the axially inward face of the bead region of the tire. The hump is preferably at a similar radial height in the tire to the annular reinforcement such that the abutting of said hump to the wheel rim generates maximum reaction force at about 90° of bead rotation from the rest position.

The hump is preferably profiled in cross-section of the tire in the manner of a cam.

The radially inner portion of the hump is preferably concave or cut away in an axially outwards direction towards the toe sufficiently to allow the toe to bend to allow tire fitting. The concavity is, however, preferably complementarily shaped to the axially inward surface of the groove so that abutment occurs as soon as possible after initial rotation of the bead about the toe.

The hump may comprise elastomeric material of any hardness known in the art for the bead region of the tire. More preferably, however, the elastomer of the hump together with any reinforcement material included therein are chosen to effectively provide a hard compound having a hardness greater than 50° Shore or more preferably in the range 60°–96°.

The complementary shaping of the hump and wheel rim may be provided in addition by means of a raised wheel rim profile. The wheel rim may for example have a raised hump immediately inboard of the groove or may have the axially inward groove shoulder raised axially and radially. Such an arrangement provides an asymmetric groove cross-section.

The abutment means may be provided in the wheel rim alone for example by a circumferentially extending raised hump as described in the previous paragraph without any additional hump on the axially inward surface of the tire bead.

Then again the abutment means may be provided by means separate to both the tire and the wheel rim for example a ring of hard elastomeric material or plastics material attachable to the tire or wheel rim in a position adjacent to the tire bead such that upon bead rotation the ring is engaged between the bead and the wheel rim.

Another aspect of the present invention provides a tire comprising a tread portion, sidewalls and a pair of bead regions each containing a substantially inextensible annular reinforcement wherein at least one of the bead regions is provided with an axially and radially projecting extended toe portion, the extended toe comprising elastomeric material being flexible in a direction perpendicular to its length and substantially rigid in the direction of its length the bead region further including abutment means comprising a hump of elastomeric compound formed on the axially inward face of said bead region such that when fitted to a wheel rim having a complementary groove formed therein to accommodate said extended toe portion and lateral road induced force is applied to the tire tread the hump contacts the rim after initial rotation of the bead region to generate additional bead retaining forces to those generated by the toe in the groove.

The hump is preferably formed from elastomeric material having a hardness greater than 50° Shore or more preferably in the range of 60°–96° Shore.

Further features of the invention will be apparent from the following description by way of example only, of some embodiments of the present invention in conjunction with the attached diagrammatic drawings in which.

Figure 1:
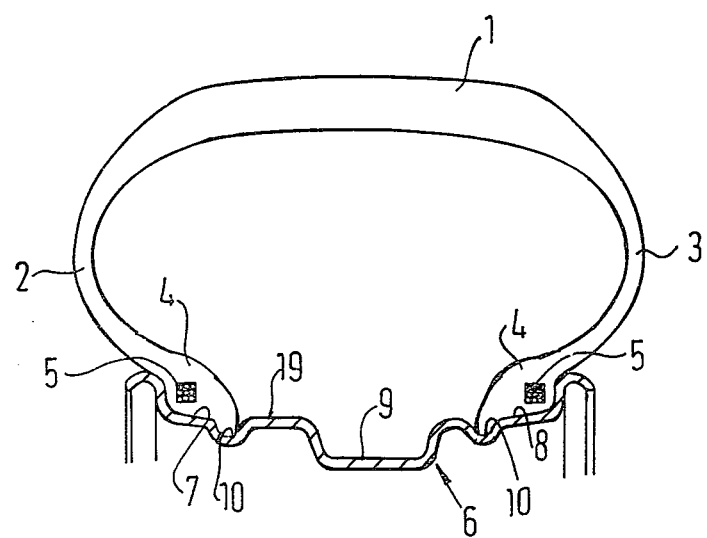
FIG. 1 is a cross-section of a tire and wheel rim assembly according to one aspect of the present invention.

The tire shown in FIG. 1 comprises a tread portion 1 and a pair of sidewalls 2 and 3 each culminating in a bead region 4. The tire shown is a low profile radial ply tire but the invention is equally applicable to tires of other constructions. Each bead region 4 of the tire includes an annular reinforcement 5 of steel wire in conventional manner.

The tire is fitted to a wheel rim 6 having a pair of spaced apart bead seats 7 and 8, a central fitting well 9 and adjacent to each bead seat a groove 10 formed in the same manner as the groove shown in the aforementioned co-pending application of the same Applicants. The groove comprises a symmetrical groove rolled into the material of the wheel rim.

Figure 2:
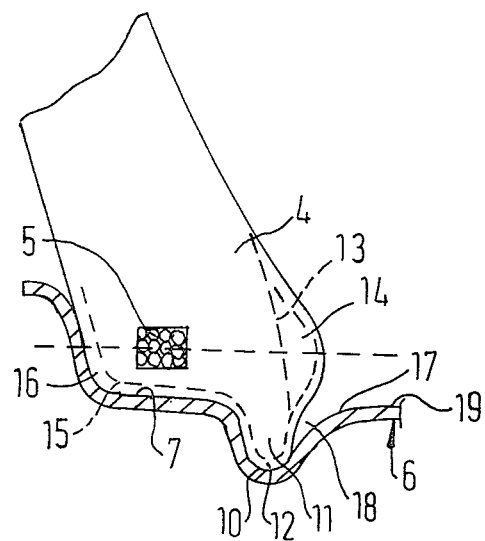
FIG. 2 is an enlarged cross-section of one of the tire beads and bead seats of the tire of FIG. 1.

As can be seen more clearly in FIG. 2 the bead region 4 is provided with an axially and radially extending toe portion 11 having a tip 12 which fits into the base of the groove 10 in the wheel rim. As described in U.S. Pat. No. 4,148,348 the axially inner surface of the tire toe would have the profile shown by the broken line 13. However, according to the present invention the tire is provided with an abutment integral with the tire bead which comprises a hump 14 substantially at the same radial height as the bead wire 5. The hump 14 is made of the same hard elastomeric material as the main portion of the toe i.e. of more than 60° Shore hardness material. A reinforcement fabric sheet 15 extends around the heel 16 and the bead region 4, around the toe 11 and also the hump 14.

The operation of the invention is basically the same as the earlier case in that when lateral force is applied to the tire tread due to cornering of the vehicle when the tire is running deflated, or substantially deflated. The end 12 of the toe is prevented from axial inward movement by its engagement in the groove 10 and the bead region 4 is caused to rotate. The toe region 11 acts as a cam in that it is forced between the bead wire 5 and the wheel rim and generates force to increase the tension on the bead wire and retain the tire bead at its seat thus preventing it approaching the well 9. In this case, however, the cam effect is increased due to the hump 14 contacting the corner portion 17 of the wheel rim which is that portion on the axially inward face of the groove. Thus the material of the hump adds to the material of the toe to improve the camming effect and thus the retention effect.

An important aspect of the invention is that the use of a hump positioned as indicated provides a concavity or cut-away 18 at the axially inward side of the toe 11 so that the tire bead may be fitted to its correct position on its bead seat by inflating the tire, the toe 11 being able to bend radially outwards to allow the toe to slide over the portion 19 of the wheel rim between the well 9 and the groove 10.

Figure 3:
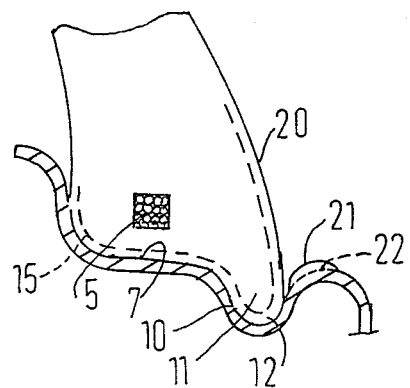
FIG. 3 shows an alternative embodiment of the invention.

The embodiment shown in FIG. 3 has a tire toe according to U.S. Pat. No. 4,148,348. The toe has a tip 12 which engages in a groove 10 in the wheel rim and the axially inner face 20 of the toe is only slightly convex as shown in the Figure. In this case, however, the groove 10 in the wheel rim is modified in that it includes an abutment shoulder 21 on its axially inner side. The profile of the original groove is shown by the broken line 22 in order to emphasize the protrusion of the shoulder 21 towards the toe. Here again, the shoulder is shaped so that the toe is able to be fitted by inflation pressure into the groove 10. Operation is the same as the previous embodiment in that the shoulder 21 abuts the toe of the tire to improve the camming effect.

While the two embodiments described provide abutments integral with the tire or wheel rim it should be appreciated that the abutment could be a separate member in the form of rings for example a plastics material or steel which are attached either to the tire bead region or to the axially inner surface of the groove during tire fitment.

Having now described our invention what we claim is:

1. A tire comprising a tread portion, sidewalls and a pair of bead regions each containing a substantially inextensible annular reinforcement wherein at least one of the bead regions is provided with an axially and radially projecting extended toe portion, the extended toe comprising elastomeric material being flexible in a direction perpendicular to its length and substantially rigid in the direction of its length, the bead region further including abutment means comprising a hump of elastomeric compound formed on the axially inward face of said bead region such that when fitted to a wheel rim having a complementary groove formed therein to accommodate said extended toe portion and lateral road induced force is applied to the tire tread the hump contacts the rim after initial rotation of the bead region to generate additional bead retaining forces to those generated by the toe in the groove.

2. A tire according to claim 1 wherein the hump is formed at a similar radial height to the annular reinforcement.

3. A tire according to claim 2 wherein the hump in radial cross-section is smoothly profiled in the manner of a cam.

4. A tire according to claim 3 wherein the elastomeric compound hardness is in the range of 60°-96° Shore.

5. A tire according to claim 1 wherein the radially inner portion of the hump is concave in an axially outward direction to allow the toe to bend for tire fitting.

6. A tire according to claim 1 wherein the elastomeric compound forming the hump has a hardness greater than 50° Shore.

7. A tire according to claim 1 wherein the elastomeric compound includes a reinforcement material.

8. A tire according to claim 1 wherein the abutment is reinforced by a ply of reinforcement fabric positioned adjacent to the surface of the abutment.

9. A tire and wheel rim assembly wherein the tire comprises a tread portion, sidewalls and a pair of beads each containing a substantially inextensible annular reinforcement and being seated upon a bead seat one at each side of the wheel rim; the wheel rim including a tire fitting well and being formed axially inward of and adjacent to at least one bead seat to provide a circumferentially extending groove which axially and radially locates at least the radially inward extremity or tip of an extended toe portion of the associated tire bead, the said toe portion comprising elastomeric material, extending lengthwise from the annular reinforcement to the tip in a direction radially and axially inwards of the annular reinforcement, being flexible in a direction perpendicular to its length and having a cross-section relative to the wheel rim groove to allow tire fitting by inflation pressure to locate the toe in said groove and being substantially rigid in the direction of its length such than when an axially inwards force at the tread portion is applied to the bead by the tire sidewall in the ground contacting portion of the tire circumference, the tip of the toe remains in the groove and the bead is caused to rotate wherein an abutment means comprising elastomeric compound is provided integrally with the tire between the tire bead and the wheel rim and axially inwards of a radial plane through the axially innermost point of the toe tip where said point contacts the rim in the fitted position, the abutment means being such that abutment with the wheel rim occurs after initial rotation of the bead and said abutment means subsequently generates additional bead retaining forces to those generated by the toe in the groove.

10. A tire and wheel rim assembly according to claim 1, wherein the abutment means comprises a separate ring of hard material attached to the bead of the tire subsequent to its manufacture.

11. A tire and wheel rim assembly according to claim 1 wherein the abutment means comprises a hump formed on the axially inward face of the bead region of the tire.

12. A tire and wheel rim assembly according to claim 11 wherein said hump is at a similar radial height in the tire to the annular reinforcement such that the abutting of said hump to the wheel rim generates maximum reaction force at about 90° of bead rotation from the rest position.

13. A tire and wheel rim assembly according to claim 11 wherein the hump in radial cross-section of the tire is profiled in the manner of a cam.

14. A tire and wheel rim assembly according to claim 11, wherein the radially inner portion of the hump is concave in an axially outward direction to allow the toe to bend for tire fitting.

15. A tire and wheel rim assembly according to claim 14 wherein the concave profile is shaped to be complimentary to the axially inward surface of the groove so that abutment occurs as soon as possible after initial rotation of the bead about the toe.

16. A tire and wheel rim assembly according to claim 11, wherein the elastomeric compound forming the hump has a hardness greater than 50° Shore.

17. A tire and wheel rim assembly according to claim 16 wherein the hardness is in the range of 60°–96° Shore.

18. A tire and wheel rim assembly according to claim 11, wherein the elastomeric material comprising the hump includes a reinforcement material so that the elastomeric compound comprises elastomeric material and reinforcement material compounded together.

19. A tire and wheel rim assembly according to claim 11, wherein the hump is reinforced by a ply of reinforcement fabric positioned adjacent to the surface of the abutment.

* * * * *